United States Patent [19]
Spaeth

[11] Patent Number: 5,828,738
[45] Date of Patent: Oct. 27, 1998

[54] MOBILE TELEPHONE-VEHICLE METER DEVICE INTERFACE

[76] Inventor: Robert D. Spaeth, 10033 E. Friess Dr., Scottsdale, Ariz. 85260

[21] Appl. No.: 770,332

[22] Filed: Dec. 20, 1996

[51] Int. Cl.[6] .......................... H04M 15/00; H04M 11/00; G07B 13/00

[52] U.S. Cl. .......................... 379/130; 379/140; 455/407; 235/30 R

[58] Field of Search ................................. 379/111, 112, 379/114, 119, 130, 131, 132, 140, 143, 144, 155; 455/403, 405, 406, 407, 408, 426; 235/30 R, 30 A; 346/15, 14 MR, 16; 705/16, 24, 400

[56] References Cited

U.S. PATENT DOCUMENTS

| | | |
|---|---|---|
| 4,122,308 | 10/1978 | Weinberger et al. . |
| 4,750,200 | 6/1988 | Sato et al. . |
| 4,751,728 | 6/1988 | Treat . |
| 4,813,065 | 3/1989 | Segala ........................ 379/130 |
| 4,951,308 | 8/1990 | Bishop et al. ................ 379/144 |
| 5,291,543 | 3/1994 | Freesse et al. . |
| 5,319,613 | 6/1994 | Adams ......................... 235/30 R |
| 5,361,297 | 11/1994 | Ortiz et al. ................... 455/407 |
| 5,400,395 | 3/1995 | Berenato . |
| 5,509,056 | 4/1996 | Ericsson et al. . |
| 5,517,549 | 5/1996 | Lee . |
| 5,577,100 | 11/1996 | McGregor et al. ............ 455/406 |

*Primary Examiner*—Paul Loomis
*Attorney, Agent, or Firm*—Pepper Hamilton LLP

[57] ABSTRACT

An apparatus and method for interfacing a mobile telephone and a meter device for use in a vehicle includes a mobile telephone and a metering device. The mobile telephone, such as a digital, cellular radio, or satellite telephone, and the meter device, such as a taxicab meter, are connected to a mobile interface. The mobile interface allows an individual riding in the vehicle to place or receive a call while riding in the vehicle, and to be charged for the use of the mobile telephone call and the fare on the taxicab meter in a single consolidated bill.

17 Claims, 7 Drawing Sheets

MOBILE TELEPHONE-VEHICLE METER DEVICE INTERFACE

TECHNICAL FIELD

The present invention generally relates to the field of mobile telephones and an interface for connecting a mobile telephone to a metering device of a vehicle. The present invention enables someone riding in a vehicle to use a mobile telephone and receive a single consolidated bill including charges for both the use of the mobile telephone and the fare accumulated on the meter device.

BACKGROUND ART

In today's society, there is an increasing need and desire for people to travel. As a result, there is also an increasing need for vehicle transportation. Whether travelling for business or pleasure, many people find it desirable to place or receive telephone calls by using a mobile telephone located and traveling in the vehicle. However, placing or receiving a mobile telephone call from the vehicle poses the problem of charging an individual for use of the mobile telephone. Presently, an individual placing or receiving a mobile telephone call in a vehicle is charged for use of the mobile telephone on a monthly basis. If the vehicle is being rented by the occupant based on time or mileage, a separate bill is generated for the charges incurred by use of the vehicle. Therefore, separate bills must be paid for use of the mobile telephone and for use of the vehicle.

Because separate bills are created for mobile telephone and vehicle use, mobile telephones are not widely used in vehicles, such as taxis, limousines, and the like. The reason that mobile telephones are not widely used, I have discovered, is because it is difficult to bill the user of the mobile telephone in a convenient, consistent and acceptable manner.

I have discovered, therefore, that there is a need to provide the mobile telephone user a consolidated bill for use of the vehicle and telephone, particularly in view of the increased availability of mobile telephones. No prior metering devices, to my knowledge, provides this important feature which offers easier and convenient access to usage of the mobile telephone, and ultimately, to much more usage of the mobile telephone in a vehicle, such as a taxi.

U.S. Pat. No. 4,122,308 to Weinberger, the entirety of which is hereby incorporated by reference, describes a telephone metering device for monitoring the cost of a land-based telephone call at the location of the calling telephone. The initial billing rate and initial billing time period appear on digital displays, as well as the billing rate for the next billing time period and the corresponding period duration. Circuitry is provided to continually maintain the billing displays on a current basis, providing an accurate indication of the cost of the call. At the conclusion of the call the total cost thereof is automatically entered into an accumulator which provides information as to the total month-to-date costs of calls placed from the telephone.

While the patent to Weinberger describes an apparatus for monitoring the cost of a telephone call, it does not describe an interface which connects a mobile telephone and vehicle meter device in order to consolidate charges for use of the mobile telephone and charges for use of the vehicle. Therefore, there exists a need for someone travelling in a vehicle to be able to use a mobile telephone, and at the same time receive a single consolidated bill including the mobile telephone charge(s) and the vehicle fare.

DISCLOSURE OF THE INVENTION

I have realized a need for a mobile apparatus in a vehicle which is capable of allowing a user to place or receive a telephone call and simultaneously display the cost of the telephone call in combination with a meter device, so as to enable the person to monitor the cost of the telephone call and meter device fare while riding in the vehicle.

I have also realized a need for a method capable of allowing a user in a vehicle to place or receive a telephone call and simultaneously display the cost of the telephone call in combination with a meter device so as to enable the person to monitor the cost of the telephone call and meter device fare while riding in the vehicle.

I have also discovered a need for a mobile apparatus which can calculate the cost of a telephone call and a meter device fare and display a total bill for the person riding in the vehicle so as to avoid having to pay separate bills for the telephone call and the meter device fare.

It is a feature and advantage of the present invention to provide such a practical mobile apparatus and method for use in a vehicle. The apparatus and method monitors and displays the use of a mobile telephone in connection with a metering device.

The present invention is based, in part, on the discovery of the problem of poor or uncharacteristically low usage of mobile telephones in the context of vehicles, such as taxis. I have discovered that taxi drivers do not characteristically provide mobile telephone service because of the great difficulty in billing the customer. Accordingly, I have discovered that an interface device provided between a mobile telephone and a standard taxi metering device (or other similar device) greatly facilitates usage of the mobile telephone in the taxi setting. Of course, other applications of the telephone metering device are possible, and the invention is not to be constrained to the taxi setting.

According to one aspect of the present invention, a person who has acquired the use of or rents a vehicle may place or receive a telephone call via a mobile telephone located in the vehicle. By a user activating an ON/OFF switch attached to the mobile telephone, the mobile apparatus monitors the length of time of the telephone call and displays the cost of the telephone call, and displays the sum of the cost of the telephone call and the meter device fare.

According to another aspect of the invention, a person who has acquired the use of a vehicle may place or receive a telephone call via a mobile telephone located in the vehicle. When a "transmission-on timer" located in the mobile telephone indicates that a call has been received or placed, the mobile apparatus begins monitoring the length of time of the telephone call and displays the cost of the telephone call, and displays the sum of the cost of the telephone call and the meter device fare.

According to another aspect of the invention, a method is provided for an interface connected to a mobile telephone and a meter device for receiving a mobile telephone call and a meter device fare. The method monitors the telephone call and the meter device and outputs the cost of the telephone call, and outputs the sum of the cost of the telephone call and the cost of the meter device fare.

Additional objects, advantages and novel features of this invention will be set forth in part in the description which follows, and in part, will become apparent to those skilled in the art upon examination or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The present invention is based on identification of, and solving the problem of using a mobile telephone, such as a digital, cellular or satellite telephone, while riding in a vehicle, such as a taxicab, and receiving a single consolidated bill for using the mobile telephone and the taxicab. By interfacing a mobile telephone and a taxicab meter, a customer is able to receive a single consolidated bill based on the use of the mobile telephone and the taxicab meter fare.

Figure 1:
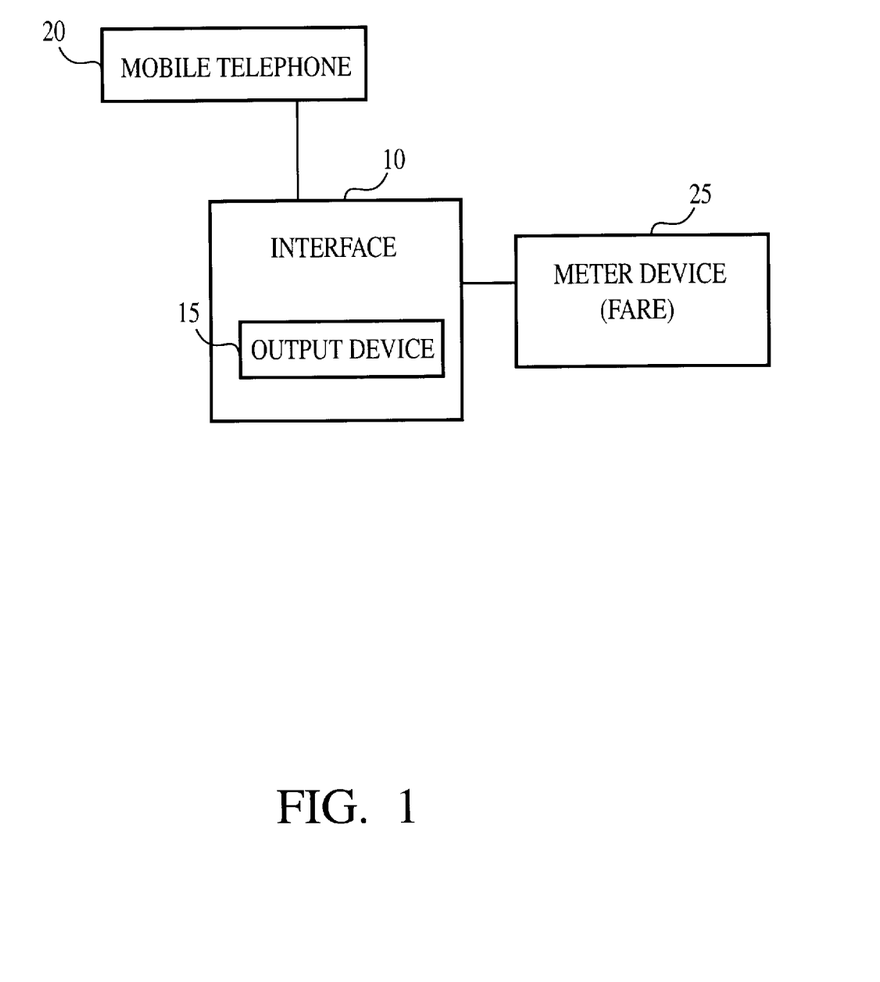
FIG. 1 is an exemplary diagram of a mobile interface connected to a mobile telephone and a meter device for use in a vehicle.

FIG. 1 is a block diagram illustrating a mobile interface connected to a mobile telephone and a meter device for use in a vehicle. Mobile interface 10 is connected to a standard mobile phone 20 and to meter device 25. Meter device 25 is, for example, a standard taxicab meter including a reset switch 1 and an end-of-fare/power down switch 2. Mobile interface 10 includes output device 15 which is capable of printing and/or displaying the cost of operating mobile telephone 20 and the fare of meter device 25, while riding in vehicle 5. The details of mobile interface 10 are discussed in detail below.

Figure 2:
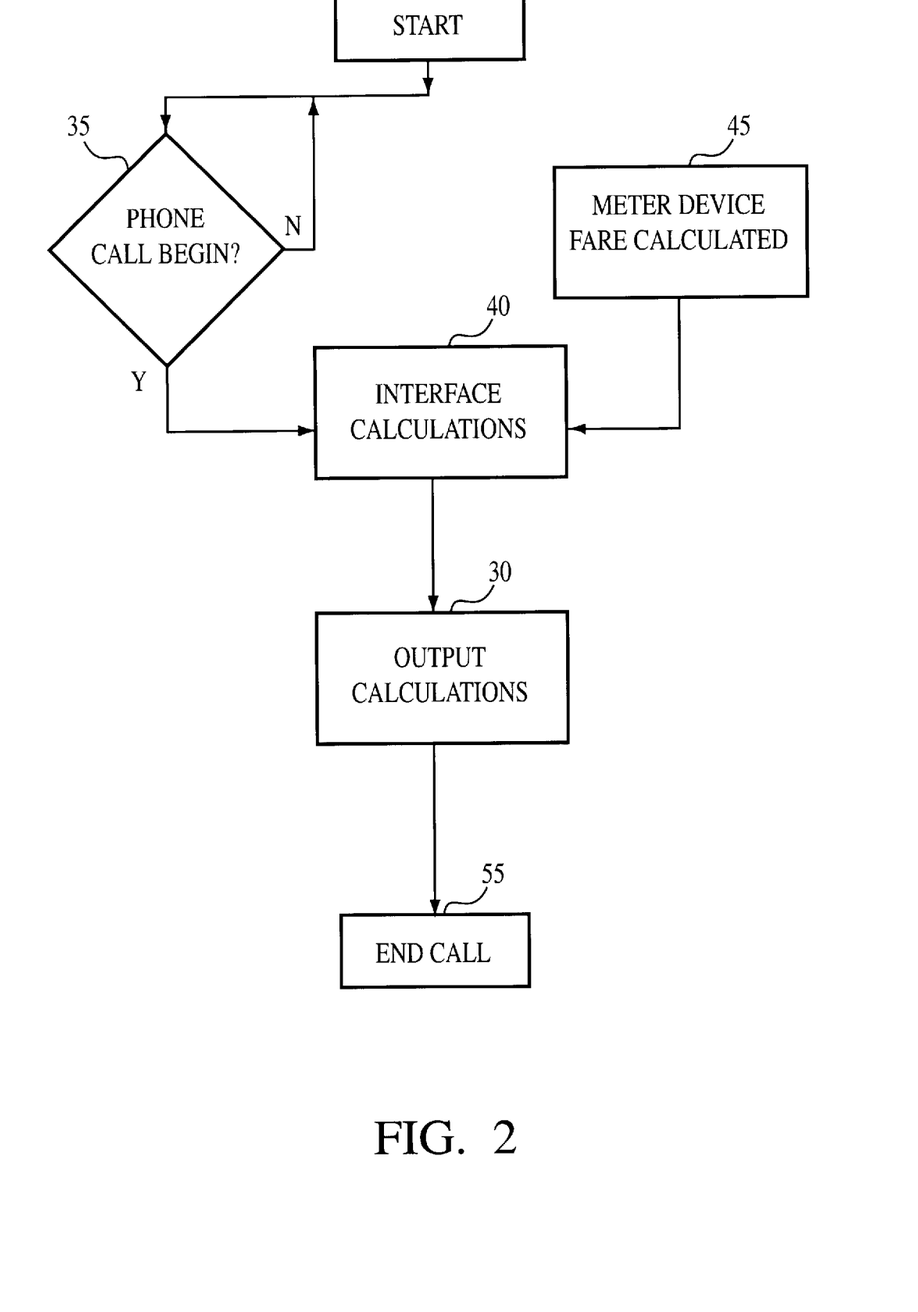
FIG. 2 is a flow diagram illustrating the operation of the mobile interface of FIG. 1.

The operation of mobile interface 10 will now be described with reference to FIG. 2. Operation of mobile interface 10 begins when a user places or receives a telephone call in step 35 from mobile telephone 20. Concurrently, meter device 25 calculates a fare based on the use of vehicle 5 in step 45. Once a telephone call has been placed or received, mobile interface 10 in step 40 begins to calculate an output based on the length of time of the telephone call and the meter device 25 fare. The calculations are output to output device 15 in step 50 until the telephone call ends in step 55.

Figure 3:
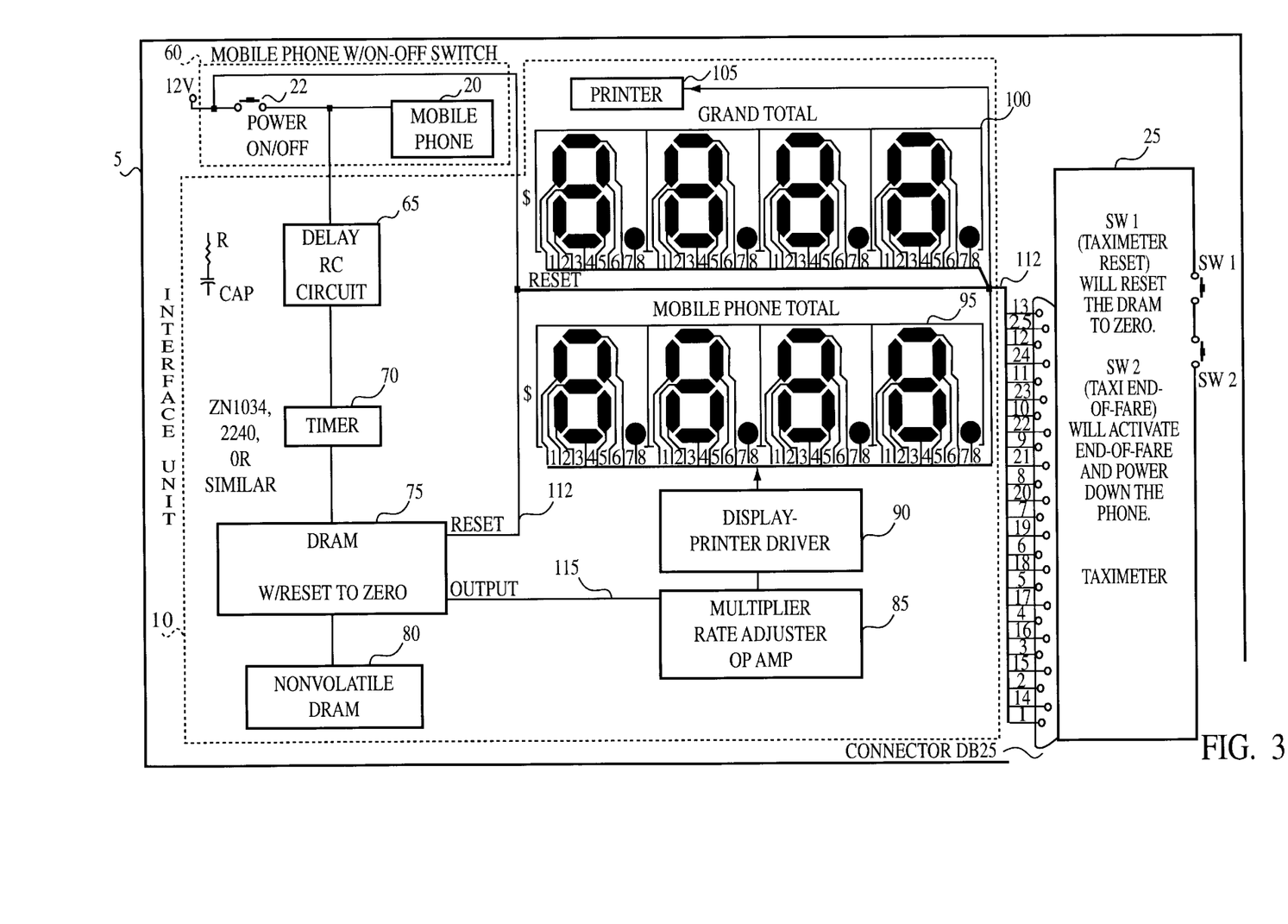
FIG. 3 is an exemplary diagram of a "mechanical" mobile interface connected to a mobile telephone and a meter device for use in a vehicle.

FIG. 3 is an exemplary diagram of a "mechanical" mobile interface connected to a mobile telephone and a meter device for use in a vehicle. Vehicle 5 includes mobile interface 10 which is connected to a standard mobile telephone unit 60, for example, via a wire, and to meter device 25, for example, via a standard RS232 connector.

Mobile telephone unit 60 further includes power on/off switch 22 and mobile telephone handset 20 connected to the power supply of vehicle 5. Mobile telephone unit 60 may be, for example, a cellular telephone, a digital telephone, a radio telephone using standard PCS, SMR or the like frequencies, or a satellite telephone. Mobile interface 10 is activated when a user turns power on/off switch 22 of mobile telephone unit 60 to the "on" position, indicating that a call is to be placed or received on mobile telephone 20.

Mobile interface 10 further includes the following components: delay circuit 65, timer 70, dynamic random access memory (DRAM) 75, non-volatile DRAM 80, operational amplifier 85, display/printer driver 90, display 95, display 100, and printer 105. Delay circuit 65 includes a resistor connected in series with a capacitor, and is connected to timer 70. Delay circuit 65 delays timer 70 for a predetermined delay period, preventing timer 70 from calculating the length of time of the telephone call immediately from the moment power on/off switch 22 has been turned "on". Timer 70 is, for example, a ZN1034 standard timer manufactured by GEC Plessey Semiconductors, located in Cheney Manor, Swidon, GB Wilshire, SN2 2QW, UK. Timer 70 begins to calculate the length of time of the telephone call after having waited the predetermined delay period. Timer 70 stops calculating the length of time of the telephone call when power on/off switch 22 is turned "off".

DRAM 75, connected to timer 70, has output line 115 and reset line 112. Output line 115 is connected to operational amplifier 85, and reset line 112 is connected to on/off switch 22 and meter device 25. Accumulation of the calculated length of time of the telephone call by timer 70 is stored in DRAM 75 and non-volatile DRAM 80. As the length of time of the telephone call is accumulated in DRAM 75, it is simultaneously output to operational amplifier 85. If on/off switch 22 is turned "off", or meter device 25 is reset, then DRAM 75 is reset is to zero. Before DRAM 75 is reset, the accumulated length of time of the telephone call is stored in nonvolatile DRAM 80.

Display/printer driver 90 is connected to operational amplifier 85. The accumulated length of time of the telephone call is output from DRAM 75 via output line 115 to operational amplifier 85, wherein the output is variably adjusted and sent to display/printer driver 90. Display/printer driver 90 is also connected to display 95, display 100 and printer 105. Displays 95 and 100 may be, for example, a standard LCD or LED display. Displays 95 and 100 and printer 105 are connected to meter device 25 via reset line 112. Reset line 112 may be, for example, a standard RS232 connector.

Figure 4:
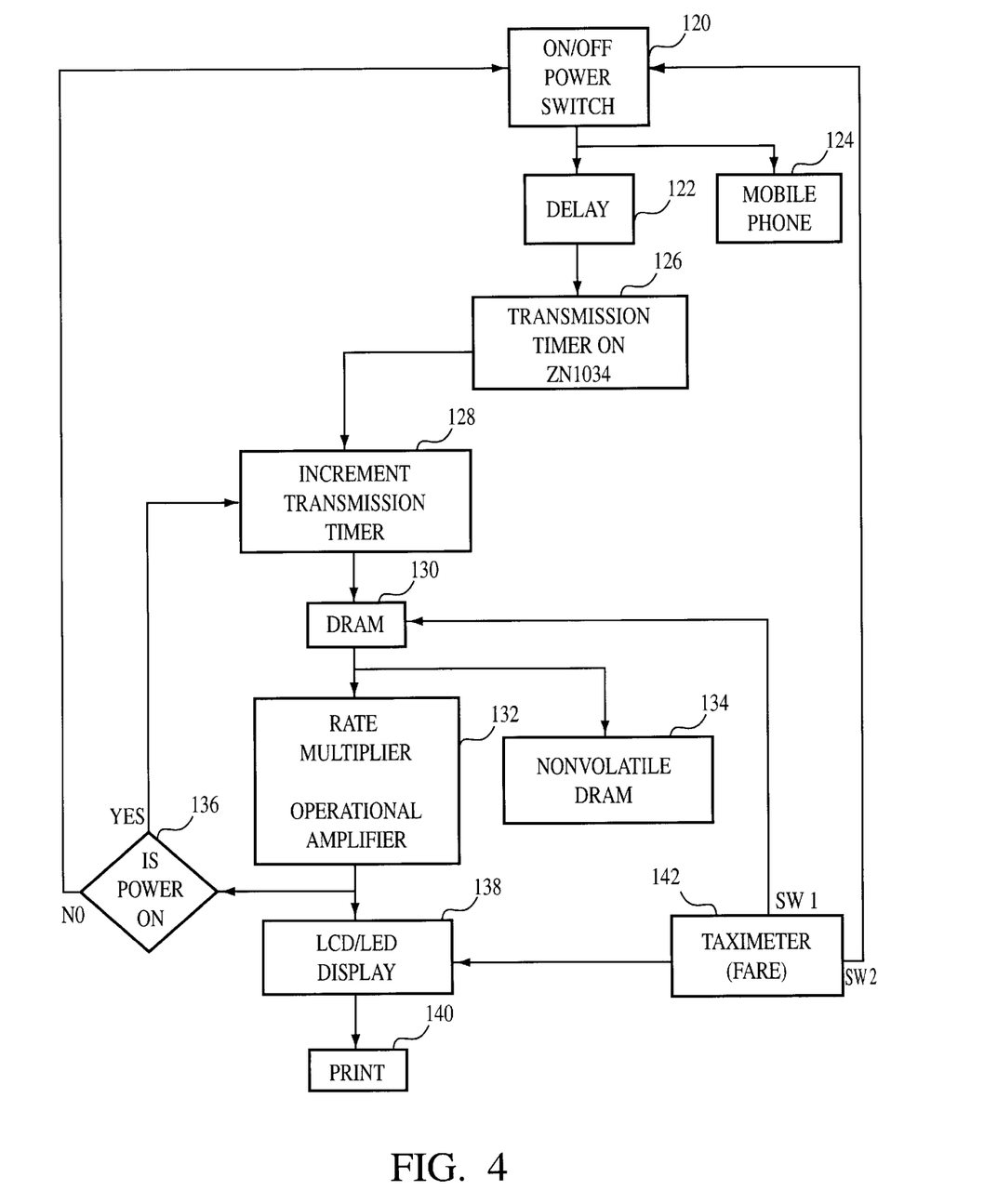
FIG. 4 is a flow diagram illustrating the operation of the mobile interface of FIG. 3.

Operation of mobile interface 10 illustrated in FIG. 3 will now be described with reference to the flow diagram in FIG. 4. Operation of mobile interface 10 begins in step 120 where on/off switch 22 is turned "on" by a user, powering up mobile telephone 20 via the 12 volt battery located in vehicle 5, and indicating that a telephone call is in progress in step 124. Alternatively, mobile telephone unit 60 may include its own power supply, such as a battery, which provides operational power to mobile telephone unit 60 when on/off switch 22 is turned "on".

Delay circuit 65 delays timer 70 from calculating the length of time of the telephone call for a predetermined period of time in step 122, ensuring that the user has sufficient time to dial the telephone number before any cost for use is accumulated. Once the predetermined period of time has elapsed, timer 70 is activated in step 126 and begins accumulating the length of time of the telephone call in step 128. The accumulated time from timer 70 is stored in DRAM 75 in step 130. As time is accumulated in DRAM 75, the accumulated time is output from DRAM 75 via output line 115 to operational amplifier 85 in step 132. Operational amplifier 85 has a rate adjuster, such as a potentiometer, which enables the owner of vehicle 5 to variably adjust the per-minute cost of the telephone call.

Operational amplifier 85 then outputs the adjusted fee of the telephone call in real time as the call progresses to display/printer device 90 which drives displays 95 and 100 and printer 105 in step 132. Displays 95 and 100, for example a LCD or LED display, display the cost of the telephone call that has been variably adjusted by operational amplifier 85 in step 138 in an accumulated manner over time, thereby displaying to the mobile telephone user how much the telephone call will cost at any given time. Specifically, display 95 displays the "mobile telephone total", which is the cost of the telephone call as adjusted by operational amplifier 85. Display 100 displays the "grand total", which is the sum of the cost of the telephone call as adjusted by operational amplifier 85 and the fare calculated by meter device 25 as use of the vehicle also progresses over time. Similarly, the "mobile telephone total" and "grand total" may be printed by printer 105 in step 140.

At the conclusion of a mobile telephone call from mobile telephone 20, the user may either make an additional call or terminate the use of mobile telephone 20. Mobile interface 10 determines in step 136 whether an additional mobile telephone call has been made, or whether the mobile telephone call has terminated. If mobile interface 10 determines in step 136 that on/off switch 22 is in the "on" position, then timer 70 continues to increment the length of time of the telephone call in step 128 and mobile interface 10 continues to operate as described above.

If mobile interface 10 determines in step 136 that on/off switch 22 is in the "off" position, then the mobile telephone call has terminated and timer 70 stops calculating the length of time of the mobile telephone call. Once a call has terminated, the amount of time accumulated in DRAM 75 is stored in non-volatile DRAM 80 in step 134 and DRAM 75 is reset to zero. The amount of time accumulated in non-volatile DRAM 80 is later used to monitor total usage time and to calculate the actual mean time between failure (MTBF) for mobile interface 10.

At the conclusion of using vehicle 5, the owner of vehicle 5 may activate end-of-fare/power down switch 2 on meter device 25, ending the accumulation of the fare in meter device 25 and powering down mobile telephone 20 in step 142. The activation of end-of-fare/power down switch 2 also stops timer 70 from further calculating the length of time of the mobile telephone call from mobile telephone 20. Further, when end-of-fare/power down switch 2 is activated on meter device 25, the amount of time accumulated in DRAM 75 is stored in non-volatile DRAM 80 in step 134. After having activated end-of-fare/power down switch 2, the owner of vehicle 5 may activate reset switch 1 in order to reset DRAM 75 and displays 95 and 100 in step 142.

Figure 5:
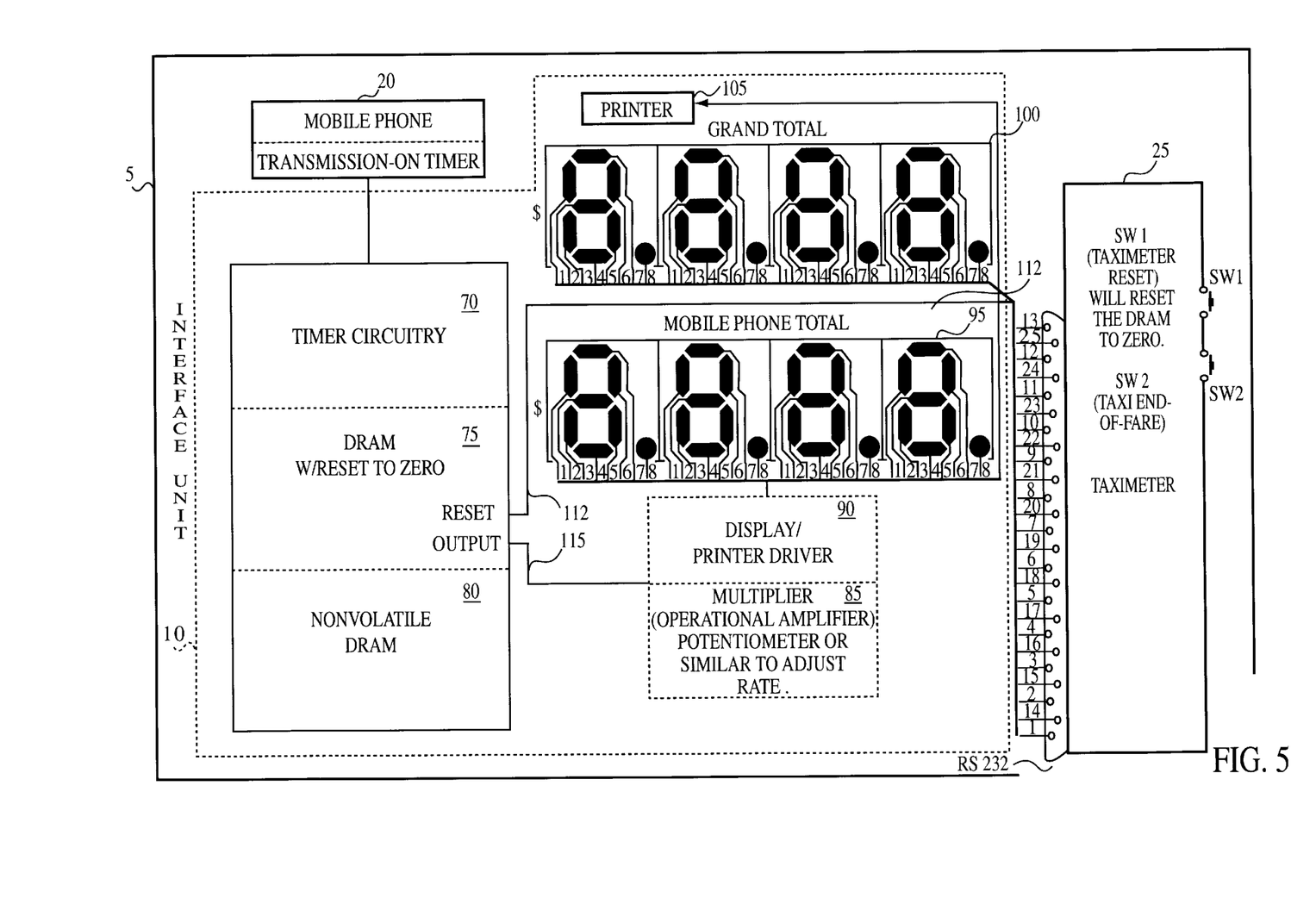
FIG. 5 is an exemplary diagram of a "transmission-on timer" mobile interface connected to a mobile telephone and a meter device for use in a vehicle.

FIG. 5 is an exemplary diagram of a "transmission-on timer" mobile interface connected to a mobile telephone and a meter device for use in a vehicle. Vehicle 5 includes a mobile interface 10 which is connected to mobile telephone 20, for example, via a wire, and to meter device 25, for example, via a standard RS232 connector.

A typical mobile telephone, such as mobile telephone 20, includes interval timers, one of which is a transmission-on timer. The transmission-on timer senses the beginning and end of a telephone call placed by a user on the mobile telephone.

Mobile interface 10 includes timer 70, DRAM 75, non-volatile DRAM 80, operational amplifier 85, display/printer driver 90, display 95, display 100, and printer 105. Timer 70 is connected to DRAM 75 and begins calculating the length of time of a telephone call once the transmission-on timer senses the start of a telephone call on mobile telephone 20. DRAM 75 is also connected to non-volatile DRAM 80 and accumulates the length of time of a telephone call calculated by timer 70.

DRAM 75 further includes a reset line 112 and output line 115 for resetting DRAM 75 and outputting the accumulated length of time of the telephone call, respectively. Output line 115 connects DRAM 75 to operational amplifier 85. Operational amplifier 85, including for example a standard potentiometer, is connected to display/printer driver 90 and enables the owner of vehicle 5 to variably adjust the per-minute cost of the telephone call. Reset line 112 is connected to meter device 25 via a standard RS232 connector, and enables DRAM 75 to reset to zero when reset switch 1 of meter device 25 is activated.

Displays 95 and 100, and printer 105 are connected to display/printer driver 90. Display/printer driver 90 drives displays 95 and 100 and printer 105 to display the cost of the telephone call as adjusted by operational amplifier 85 as described previously. Display 95 displays the "mobile telephone total", which is the cost of the telephone call as adjusted by operational amplifier 85, via, for example, a LCD or LED display. Display 100 displays the "grand total", which is the sum of the cost of the fare calculated by meter device 25 and the cost of the telephone call as adjusted by operational amplifier 85, via, for example, a LCD or LED display. Displays 95 and 100 and printer 105 are also connected to meter device 25 via reset line 112. When reset switch 1 is activated on meter device 25 by the owner of vehicle 5, displays 95 and 100 and printer 105 are reset to zero.

Figure 6:
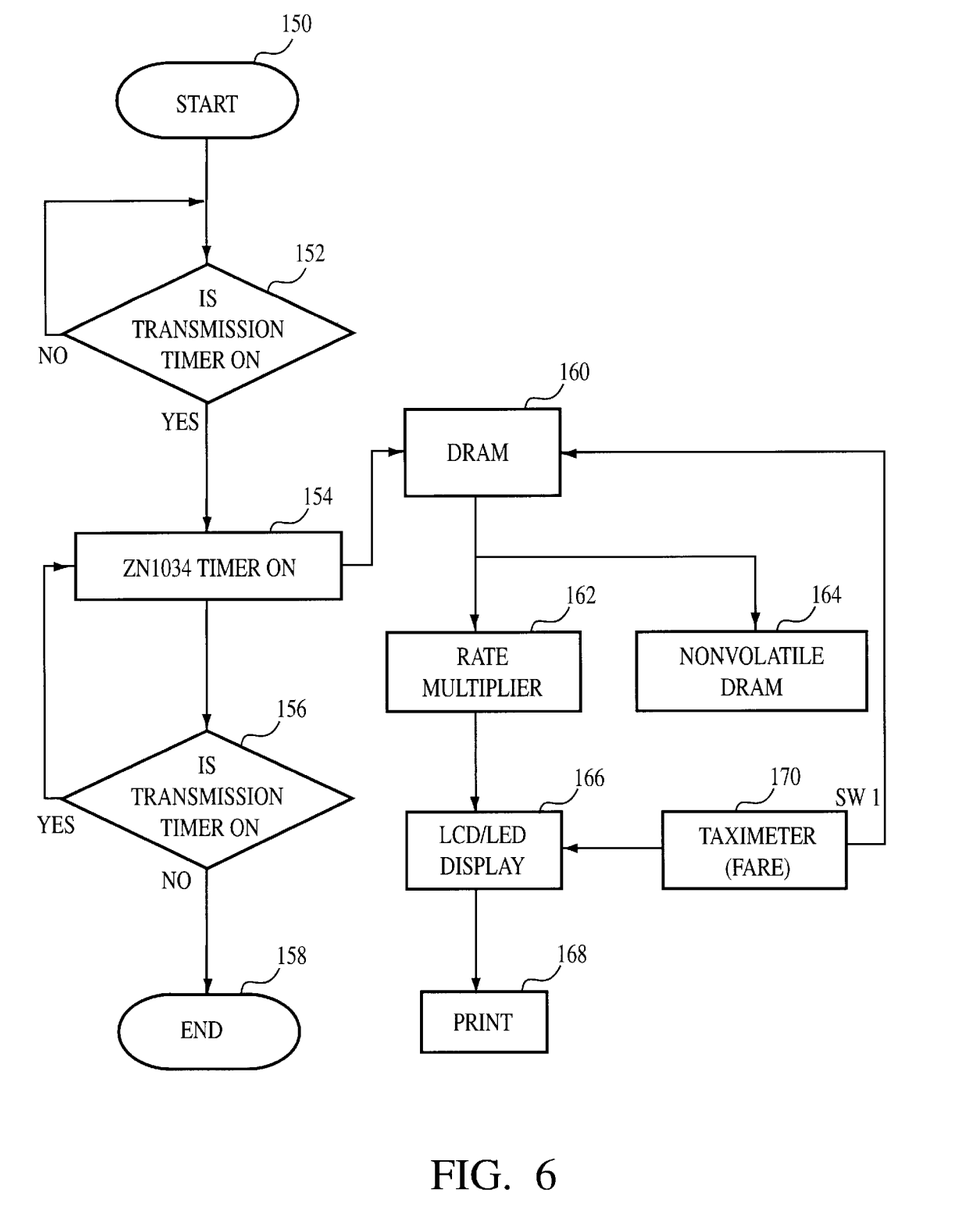
FIG. 6 is a flow diagram illustrating the operation of the mobile interface of FIG. 5.

Operation of mobile interface 10 illustrated in FIG. 5 will now be described with reference to the flow diagram of FIG. 6. Operation of mobile interface 10 begins with the user placing or receiving a telephone call from mobile telephone 20 in step 150. Upon the placing or receiving of a telephone call in step 150, mobile interface 10 determines whether the transmission on timer has activated in step 152.

If in step 152 mobile interface 10 determines that the transmission-on timer has not been activated, then step 152 is repeated until the transmission-on timer is activated. If in step 152 mobile interface 10 determines that the transmission-on timer has been activated, then timer 70 begins to calculate the length of time of the telephone call placed on mobile telephone 20 in step 154. As timer 70 calculates the length of time of the telephone call placed on mobile telephone 20, mobile interface 10 continually determines whether the telephone call is still in progress in step 156 by monitoring the transmission-on timer and verifying that the transmission-on timer is still activated. If mobile interface 10 determines that the transmission-on timer is deactivated, then the telephone call on mobile telephone 20 has ended, and timer 70 stops calculating the length of time of the telephone call placed on mobile telephone 20 in step 158. If, on the other hand, mobile interface 10 determines that the transmission-on timer is still activated, the length of time of the telephone call continues to accumulate in DRAM 75 in step 160.

The time accumulated in step 160 by DRAM 75 is output, via output line 115, to operational amplifier 85. Operational amplifier 85 adjusts the rate of the cost of the telephone call placed on mobile telephone 20 according to a predetermined rate in step 162, and outputs the adjusted cost to displays 95 and 100 and printer 105 in steps 166 and 168, respectively. Specifically, display 95 displays the "mobile telephone total" on a LCD, LED or similar display, and display 100 displays the "grand total" on a LCD, LED or similar display. Similarly, a receipt including the "mobile telephone total" and "grand total" may be printed on printer 105. Other rate adjustment devices are also contemplated, such as a look-up table that may also be stored on, for example, DRAM 75.

At the conclusion of using vehicle 5 and mobile telephone 20 by the user, the owner of vehicle 5 activates end-of-fare/power down switch 2 on meter device 25 to indicate the end-of-fare for use of vehicle 5 in step 170. Activation of end-of-fare/power down switch 2 in step 170 also stops timer 70 from calculating the length of time of the telephone call and ends the accumulation of the calculated time in DRAM 75. The accumulation of the calculated time in DRAM 75 is stored in non-volatile DRAM 80 in step 164. After the owner of vehicle 5 has activated end-of-fare/power down switch 2, the owner may activate reset switch 1 to reset the fare in meter device 25, DRAM 75, and displays 95 and 100 to zero.

The entire method is repeated for successive telephone calls placed and received on mobile telephone 20.

Figure 7:
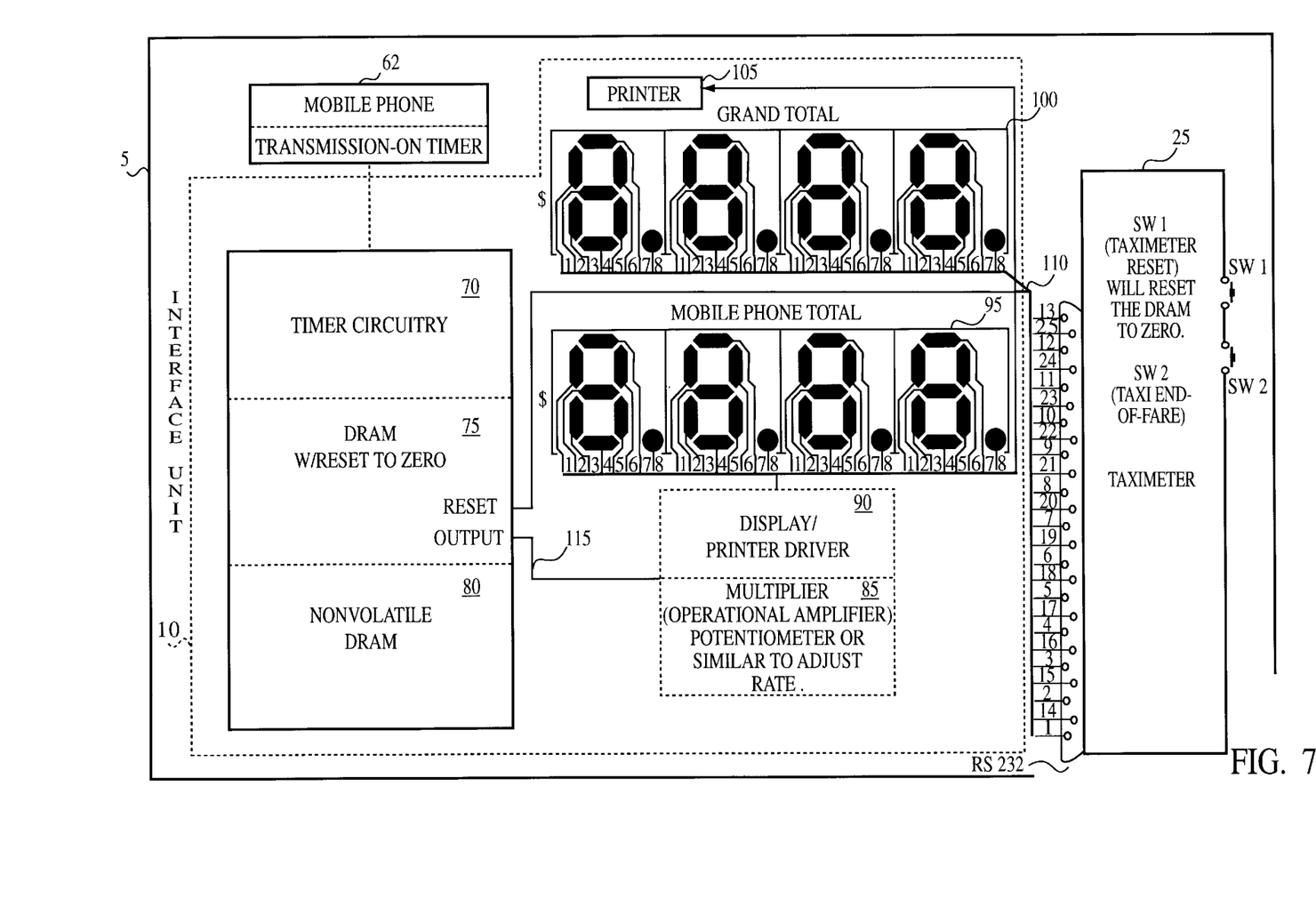
FIG. 7 is an exemplary diagram of a "transmission-on time" mobile interface connected to a mobile telephone via a wireless connection, and connected to a meter device for use in a vehicle.

FIG. 7 is an exemplary diagram of a "transmission-on timer" mobile interface connected to a mobile telephone via a wireless connection, and connected to a meter device for use in a vehicle. Mobile interface 10 illustrated in FIG. 7 is nearly identical to mobile interface 10 in FIG. 5, except that mobile telephone 20 is connected to mobile interface 10 via a wireless connection. Operation of mobile interface 10 in FIG. 7 is identical to the operation of mobile interface 10 in FIG. 5.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

For example, an alternative to the above embodiments is to utilize the same hardware/software without the use of a taxi meter and grand total display. In this instance, a cellular or other portable phone meter results which allows the owner of the portable telephone to rent or charge the use of the portable telephone by another in an efficient and productive manner. Thus, the user of the portable telephone is able to determine charges for use of same in real-time, as well as able to obtain a receipt regarding same.

What is claimed is:

1. A mobile apparatus in a vehicle comprising:
   a mobile telephone used by a user for a mobile telephone call;
   a metering device accumulating a predetermined billing rate and calculating a metered fare based on use of the vehicle; and
   an interface responsively coupled to said mobile telephone and said metering device, said interface determining and monitoring said mobile telephone used by the user and outputting at least one cost based on a combined use of said mobile telephone by a user and said metered fare.

2. The apparatus of claim 1, wherein said interface further comprises:
   a delay circuit coupled to said mobile telephone, delaying the timer from accumulating the length of the mobile telephone call;
   a timer coupled to said delay circuit, accumulating the length of the mobile telephone call of the mobile telephone used by the user;
   a first memory coupled to the timer, storing the accumulated length of time calculated by the timer;
   a second memory coupled to the first memory, storing the accumulated length of time calculated by the timer;
   an operational amplifier, coupled to the first memory, said operational amplifier adjusting a rate of the at least one cost of the mobile telephone call;
   a device driver coupled to said operational amplifier, driving an output of said operational amplifier; and
   an at least one output device coupled to said device driver and said metering device, said at least one output device outputting the at least one cost.

3. The apparatus of claim 1, wherein said interface further comprises:
   a timer coupled to said mobile telephone, accumulating the length of time of the call of the mobile telephone used by the user;
   a first memory coupled to the timer, storing the accumulated length of time calculated by the timer;
   a second memory coupled to the first memory, storing the accumulated length of time calculated by the timer;
   an operational amplifier, coupled to the first memory, said operational amplifier adjusting a rate of the at least one cost of said mobile telephone call;
   a device driver coupled to said operational amplifier, driving an output of said operational amplifier; and
   an at least one output device coupled to said device driver and said metering device, said at least one output device outputting the at least one cost.

4. The apparatus of claim 2, further comprising:
   an ON/OFF switch coupled to the mobile telephone, said ON/OFF switch initiating the accumulation of time in the timer after a delay period, when said ON/OFF switch is turned on.

5. The apparatus of claim 2, wherein said at least one output device is a display for displaying the at least one cost based on the combined use of said mobile telephone and said metered fare.

6. The apparatus of claim 3, wherein said mobile telephone further includes a transmission-on timer.

7. The apparatus of claim 3, wherein said at least one output device is a display for displaying the at least one cost based on the combined use of said mobile telephone and said metered fare.

8. The apparatus of claim 5, wherein said at least one output device further comprises:
   a printer for substantially simultaneously printing the at least one cost based on the use of said mobile telephone and said metered fare in combination with the display.

9. The apparatus of claim 7, wherein said at least one output device further comprises:
   a printer for substantially simultaneously printing the at least one cost based on the use of said mobile telephone and said metered fare in combination with the display.

10. A mobile apparatus in a vehicle, comprising:
    means for at least one of making and receiving a telephone call;
    means for accumulating a predetermined billing rate and calculating a metered fare based on use of the vehicle; and
    means for determining and monitoring said telephone call and said metered fare, and outputting at least one cost based on a combined use of said telephone and said metered fare.

11. The apparatus of claim 10, wherein said determining and monitoring means further comprises:
    means for accumulating the length of time of said telephone call;

means for delaying the accumulation of the length of time of said telephone call;

means for storing the accumulated length of time of said telephone call;

means for adjusting the rate of the at least one cost of said telephone call;

means for driving an output; and means for outputting the at least one cost.

12. The apparatus of claim 10, wherein said determining, monitoring and outputting means further comprises:

means for accumulating the length of said telephone call;

means for storing the accumulated length of said telephone call;

means for adjusting the at least one cost of said telephone call;

means for driving an output; and means for outputting the at least one cost.

13. The apparatus of claim 10, wherein said accumulating means further comprises:

means for resetting said storing means;

means for ending the accumulation of a predetermined billing rate and calculating a metered fare based on use of the vehicle.

14. An interface for use in a vehicle, connected to a mobile telephone used by a calling party and a metering device accumulating a predetermined billing rate and calculating a metered fare, a method comprising the steps of:

receiving a telephone call;

receiving a metered fare based on the use of a vehicle;

determining and monitoring said telephone call, and outputting at least one cost, based on a combined use of said telephone call and said metered fare.

15. The interface of claim 14, wherein the method of determining and monitoring further comprises:

beginning and ending said telephone call;

delaying the accumulation of time of the at least one cost of said telephone call;

accumulating the length of time of said telephone call;

storing the accumulated length of time of said telephone call;

adjusting the rate of the at least one cost of said telephone call;

driving an output; and outputting the at least one cost.

16. The interface of claim 14, wherein said determining and monitoring further comprises:

accumulating the length of time of said telephone call;

storing the accumulated length of time of said telephone call;

adjusting the rate of the at least one cost of said telephone call;

driving an output; and outputting the at least one cost.

17. A mobile apparatus in a vehicle, comprising:

a mobile telephone used by a user;

a mobile phone meter calculating, displaying and printing the cost of using the mobile telephone based on the length of time of the telephone call;

a taxicab meter calculating, displaying and printing a taxicab fare based on the use of the vehicle; and an interface device substantially connected to the mobile telephone and the taxicab meter, outputting the combined cost of the cost of using the mobile telephone and the cost of the taxicab fare.

* * * * *